United States Patent
Kalouche et al.

(10) Patent No.: US 11,794,349 B2
(45) Date of Patent: Oct. 24, 2023

(54) SYSTEM AND METHOD OF INTEGRATING ROBOT INTO WAREHOUSE MANAGEMENT SOFTWARE

(71) Applicant: Nimble Robotics, Inc., San Francisco, CA (US)

(72) Inventors: Simon Kalouche, San Francisco, CA (US); Siva Chaitanya Mynepalli, San Francisco, CA (US); John Vashchhenko, Apple Valley, CA (US); Suyash Nigam, San Francisco, CA (US); Jordan Dawson, San Francisco, CA (US); George Marchman, San Francisco, CA (US)

(73) Assignee: Nimble Robotics, Inc., San Francisco, CA (US)

(*) Notice: Subject to any disclaimer, the term of this patent is extended or adjusted under 35 U.S.C. 154(b) by 313 days.

(21) Appl. No.: 17/038,321

(22) Filed: Sep. 30, 2020

(65) Prior Publication Data
US 2021/0268658 A1 Sep. 2, 2021

Related U.S. Application Data

(63) Continuation of application No. 16/804,277, filed on Feb. 28, 2020, now Pat. No. 10,814,489.

(51) Int. Cl.
*B25J 9/16* (2006.01)
*B25J 13/08* (2006.01)
*B25J 19/04* (2006.01)

(52) U.S. Cl.
CPC ............. *B25J 9/1697* (2013.01); *B25J 9/161* (2013.01); *B25J 9/1679* (2013.01); *B25J 13/08* (2013.01); *B25J 19/04* (2013.01)

(58) Field of Classification Search
CPC ........ B25J 9/1697; B25J 9/161; B25J 9/1679; B25J 13/08; B25J 19/04; G06Q 10/087; G05B 2219/40013
See application file for complete search history.

(56) References Cited

U.S. PATENT DOCUMENTS

| | | | |
|---|---|---|---|
| 4,905,138 A | 2/1990 | Bourne | |
| 5,175,692 A * | 12/1992 | Mazouz | ................. B65G 61/00 901/7 |
| 5,361,353 A | 11/1994 | Carr et al. | |
| 5,501,571 A | 3/1996 | Van Durrett et al. | |

(Continued)

FOREIGN PATENT DOCUMENTS

| | | |
|---|---|---|
| CN | 108298243 A | 7/2018 |
| WO | 2015200025 A1 | 12/2015 |

OTHER PUBLICATIONS

International Search Report including Written Opinion for Application No. PCT/US2020/053516, dated Jan. 12, 2021, pp. 1-13.

*Primary Examiner* — Bhavesh V Amin
(74) *Attorney, Agent, or Firm* — Lerner David LLP

(57) ABSTRACT

A parsing system includes an imaging device and one or more processors. The imaging device may capture visual instructions displayed on a monitor. The one or more processors may be configured to receive, from the imaging device, the captured visual instructions, generate functions for a robot to perform based on the captured visual instructions, and transmit, to a robot, the functions to perform.

18 Claims, 8 Drawing Sheets

(56) References Cited

U.S. PATENT DOCUMENTS

| | | | |
|---|---|---|---|
| 5,513,299 A | 4/1996 | Terasaki et al. | |
| 5,596,255 A | 1/1997 | Miyazawa | |
| 6,222,465 B1 | 4/2001 | Kumar et al. | |
| 6,526,373 B1 | 2/2003 | Barral | |
| 7,210,130 B2 | 4/2007 | Fairweather | |
| 7,685,083 B2 | 3/2010 | Fairweather | |
| 8,229,402 B2 | 7/2012 | Kretz et al. | |
| 8,411,929 B2 | 4/2013 | Silver | |
| 9,120,622 B1* | 9/2015 | Elazary | B25J 9/1697 |
| 9,452,883 B1* | 9/2016 | Wurman | G06Q 10/087 |
| 9,486,713 B2 | 11/2016 | Kroyan et al. | |
| 9,545,582 B2 | 1/2017 | Kroyan et al. | |
| 9,550,624 B2* | 1/2017 | Khodl | B65G 1/1378 |
| 9,663,295 B1* | 5/2017 | Wurman | G05D 1/0287 |
| 9,688,472 B1* | 6/2017 | Stubbs | G06Q 50/28 |
| 9,694,976 B1* | 7/2017 | Wurman | B65G 1/0492 |
| 9,802,762 B1* | 10/2017 | Pikler | B65G 1/0492 |
| 9,809,384 B2* | 11/2017 | Mountz | B65G 1/1378 |
| 9,919,872 B2* | 3/2018 | Khodl | G06Q 50/30 |
| 10,007,964 B1* | 6/2018 | Calhoon | G06V 10/44 |
| 10,078,330 B2* | 9/2018 | Bhageria | G05D 1/104 |
| 10,089,586 B2 | 10/2018 | Vestal et al. | |
| 10,259,650 B2* | 4/2019 | Mountz | B65G 1/1378 |
| 10,265,227 B2* | 4/2019 | Wen | B25J 11/009 |
| 10,384,872 B2* | 8/2019 | Wicks | B65G 1/1376 |
| 10,423,150 B2* | 9/2019 | Wise | B65G 67/04 |
| 10,518,410 B2 | 12/2019 | Bradski et al. | |
| 10,549,207 B2 | 2/2020 | Kroyan et al. | |
| 10,562,707 B1* | 2/2020 | Wise | G05D 1/0246 |
| 10,618,736 B2* | 4/2020 | Khodl | G06Q 50/30 |
| 10,744,894 B2* | 8/2020 | Greyson | B60L 53/14 |
| 10,899,560 B2* | 1/2021 | Yap | G06Q 50/28 |
| 10,961,061 B2* | 3/2021 | Rose | B65G 47/2445 |
| 11,230,441 B2* | 1/2022 | Donlon | B25J 19/065 |
| 11,235,930 B2* | 2/2022 | Bastian, II | B25J 15/0616 |
| 2002/0102910 A1 | 8/2002 | Donahue et al. | |
| 2002/0103569 A1 | 8/2002 | Mazur | |
| 2004/0086364 A1* | 5/2004 | Watanabe | B25J 9/0084 |
| | | | 414/416.01 |
| 2004/0162639 A1 | 8/2004 | Watanabe et al. | |
| 2005/0226711 A1 | 10/2005 | Schnoor et al. | |
| 2006/0104788 A1 | 5/2006 | Ban et al. | |
| 2006/0111811 A1 | 5/2006 | Okamoto et al. | |
| 2009/0118890 A1 | 5/2009 | Lin et al. | |
| 2012/0029685 A1* | 2/2012 | Keller | B65G 1/1373 |
| | | | 700/216 |
| 2012/0290131 A1 | 11/2012 | Khoukhi | |
| 2013/0151007 A1 | 6/2013 | Valpola et al. | |
| 2013/0173049 A1* | 7/2013 | Brunner | G06Q 10/08 |
| | | | 700/216 |
| 2013/0288560 A1* | 10/2013 | Abou-Hamda | G05D 1/0234 |
| | | | 446/175 |
| 2013/0310956 A1 | 11/2013 | Rehkemper et al. | |
| 2014/0012415 A1* | 1/2014 | Benaim | G06V 40/28 |
| | | | 700/255 |
| 2014/0277713 A1* | 9/2014 | Kouno | B25J 9/0084 |
| | | | 700/248 |
| 2015/0032252 A1* | 1/2015 | Galluzzo | B60P 1/5423 |
| | | | 700/218 |
| 2015/0073589 A1* | 3/2015 | Khodl | G06Q 50/30 |
| | | | 700/218 |
| 2015/0332213 A1* | 11/2015 | Galluzzo | G05D 1/0248 |
| | | | 700/218 |
| 2016/0070365 A1* | 3/2016 | Patwardhan | G06F 3/038 |
| | | | 345/156 |
| 2016/0145045 A1* | 5/2016 | Mountz | B65G 1/137 |
| | | | 700/218 |
| 2016/0221187 A1* | 8/2016 | Bradski | B25J 9/1664 |
| 2016/0288280 A1 | 10/2016 | Lin et al. | |
| 2017/0066592 A1* | 3/2017 | Bastian, II | B25J 5/007 |
| 2017/0088355 A1* | 3/2017 | Khodl | B65G 1/1378 |
| 2017/0095382 A1* | 4/2017 | Wen | A61G 5/04 |
| 2017/0121113 A1* | 5/2017 | Wagner | B65G 1/1373 |
| 2017/0136632 A1* | 5/2017 | Wagner | B25J 9/0093 |
| 2017/0158430 A1* | 6/2017 | Raizer | B65G 1/065 |
| 2017/0158439 A1* | 6/2017 | Miele | G06Q 10/087 |
| 2017/0161663 A1* | 6/2017 | Miele | G06Q 10/06315 |
| 2017/0166399 A1* | 6/2017 | Stubbs | B25J 9/1664 |
| 2018/0039848 A1* | 2/2018 | Konolige | G06T 17/00 |
| 2018/0057263 A1* | 3/2018 | Beer | B25J 15/0616 |
| 2018/0072499 A1* | 3/2018 | Mountz | B65G 1/137 |
| 2018/0113475 A1* | 4/2018 | Brazeau | G05D 1/0276 |
| 2018/0141755 A1* | 5/2018 | Khodl | B25J 5/007 |
| 2018/0243904 A1 | 8/2018 | Bradski et al. | |
| 2018/0282079 A1* | 10/2018 | Heath | B25J 9/1697 |
| 2018/0319286 A1* | 11/2018 | Greyson | B60L 5/38 |
| 2018/0333841 A1* | 11/2018 | Bastian, II | B25J 9/0096 |
| 2019/0009181 A1 | 1/2019 | Kroyan et al. | |
| 2019/0233212 A1* | 8/2019 | Mountz | B65G 1/137 |
| 2019/0291955 A1* | 9/2019 | Bastian, II | B65G 1/1373 |
| 2020/0016746 A1 | 1/2020 | Yap | B25J 15/0441 |
| 2020/0017314 A1* | 1/2020 | Rose | B25J 15/0475 |
| 2020/0017315 A1* | 1/2020 | Yap | B25J 9/1612 |
| 2020/0017316 A1* | 1/2020 | Donlon | B25J 17/0225 |
| 2020/0017317 A1* | 1/2020 | Yap | B25J 15/0608 |
| 2020/0277137 A1* | 9/2020 | Bastian, II | B66F 9/065 |
| 2021/0122586 A1* | 4/2021 | Sun | B07C 1/04 |
| 2021/0347059 A1* | 11/2021 | Zhang | B65G 1/026 |
| 2022/0017303 A1* | 1/2022 | Zimmer | B61B 10/001 |
| 2022/0153523 A1* | 5/2022 | Bastian, II | B25J 15/0616 |

* cited by examiner

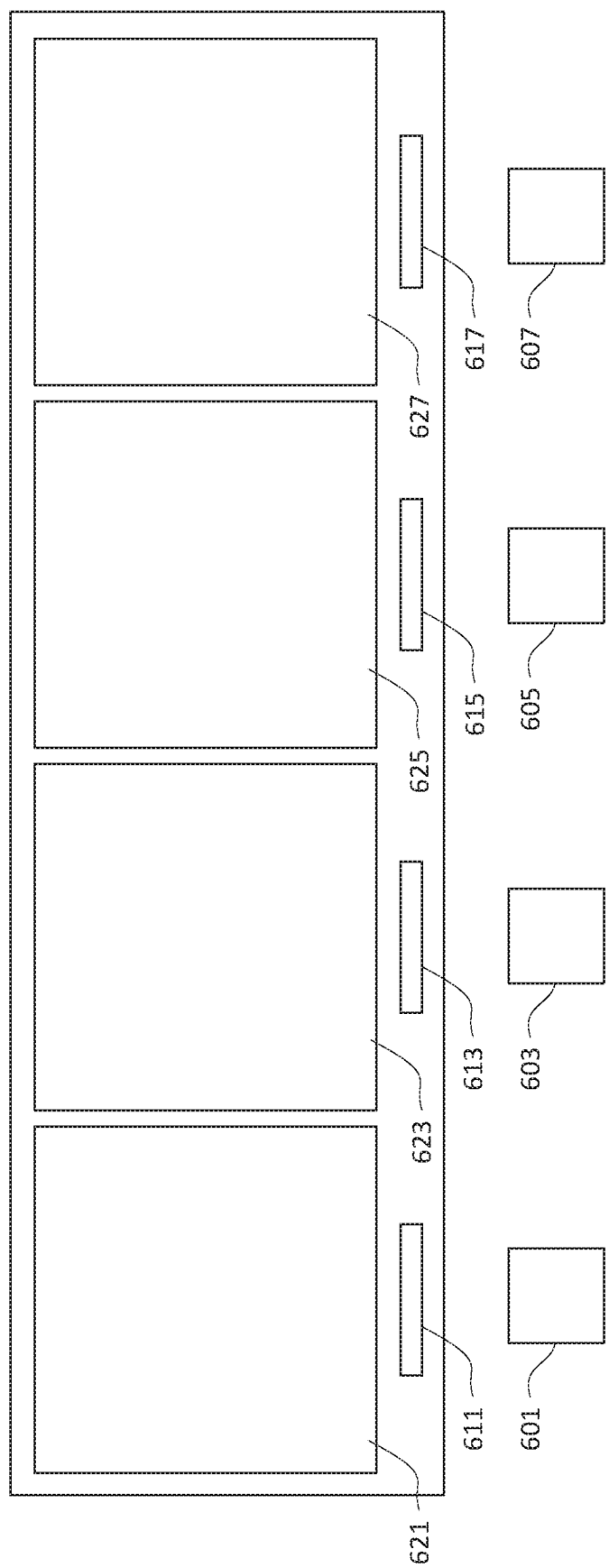

SYSTEM AND METHOD OF INTEGRATING ROBOT INTO WAREHOUSE MANAGEMENT SOFTWARE

CROSS-REFERENCE TO RELATED APPLICATION

The present application is a continuation of U.S. patent application Ser. No. 16/804,277, filed on Feb. 28, 2020, the disclosure of which is incorporated herein by reference.

BACKGROUND

Warehouses, or fulfillment centers, require systems that enable the efficient storage, retrieval, picking, sorting, packing and shipment of a large number of diverse products. Inventory is typically stored in a storage location on rows of shelving on either side of an aisle. The aisles provide access between the shelving for a picker, such as a warehouse worker or robot, to traverse the aisles and retrieve the desired products from the shelving.

The picker often traverses the aisles and retrieves products pertaining to multiple orders in a single trip to minimize the number of trips and the total distance that the picker must travel to retrieve products for a given number of orders. Retrieving products in this manner, however, necessitates that the products be sorted into individual order containers which are subsequently packaged and shipped to the consumer.

Alternatively, rather than having pickers traverse the aisles of inventory, warehouses can employ conveyance systems, robots, or Automatic Storage and Retrieval Systems (ASRS) which bring the products from the storage location to a picking station. The needed products may then be sorted into individual order containers, and then the remaining products can be returned by the systems to the storage location.

A traditional picking station includes a monitor that displays pick and place instructions received from Warehouse Software (WS) that may include warehouse management software (WMS), Warehouse Control Software (WCS), or Warehouse Execution Software (WES). The pick and place instructions may direct an operator to pick and place one or more products of a particular product type into individual order containers. Manually picking and placing each of the retrieved products is a labor-intensive, expensive and inefficient process. Replacing operators with pick and place robots can increase efficiency and lower operating costs. However, such replacement requires extensive modifications to the WS and the physical components of the picking station. In some instances, the picking station may need to be retro-fitted with additional components to operate correctly with the replacement pick and place robots. These modifications can be expensive, time consuming, and may require many $3^{rd}$ party developers to modify the existing WS and hardware. Moreover, the picking station may need to be temporarily shut-down while the WS is reprogrammed and the physical components of the picking station are retro-fitted for the pick and place robots.

The high initial costs and the temporary interruption in service are significant barriers and, for this reason, many warehouses and fulfillment centers do not replace operators with pick and place robots.

BRIEF SUMMARY

A first aspect of the technology is directed to a parsing system. The parsing system may include an imaging device to capture visual instructions displayed on a monitor and one or more processors. The one or more processors may be configured to receive, from the imaging device, the captured visual instructions, generate functions for a robot to perform based on the captured visual instructions, and transmit, to a robot, the functions to perform. In some examples, generating the functions for the robot to perform are based on the determined instructions. In some instances, the one or more processors are further configured to perform visual and optical character recognition algorithms on the captured visual instructions to determine instructions included in the visual instructions.

In some instances, the parsing system may further include a robot having a picking arm configured to grasp an item from a first location and place the item in a second location. The robot may be configured to receive the functions from the one or more processors and perform the received functions.

In some instances, the parsing system may include a button-pushing device. The button-pushing device may be a physical device, wherein upon completion of performing the received functions, the physical button-pushing device pushes a button to indicate completion. In some examples, the button-pushing device is a virtual mouse or keyboard configured to emulate signals from a mouse or keyboard on the monitor. The virtual mouse or keyboard may be programmatically controlled and upon completion of performing the received functions, the virtual mouse or keyboard selects a button on the monitor to indicate completion.

In some examples, the visual instructions are provided to the monitor, and the imaging device is a camera configured to capture an image of the visual instruction on the display. In some instances, the imaging device is an image or video capture card.

In some examples, the parsing system includes an additional robot.

Another aspect of the disclosure is directed to a system, including a robot having a picking arm configured to grasp an item from a first location and place the grasped item in a second location spaced from the first location, an imaging device to capture visual instructions displayed on a monitor, and one or more processors. The one or more processors may be configured to receive, from the image device, the captured visual instructions, generate functions for the robot to perform based on the captured visual instructions, and transmit, to the robot, the functions to perform. In some instances, the imaging device is a capture card or a camera. The robot may be configured to receive the functions from the one or more processors and perform the received functions. In some examples, the system includes a virtual mouse, wherein the virtual mouse is configured to provide a completion signal requesting a new visual instruction after the robot performs the received functions.

Another aspect of the disclosure is directed to a pick and place method including receiving, by one or more processors, an image, the image including visual instructions, executing, by the one or more processors, vision and optical character recognition algorithms on the image to determine the instructions included in the visual instructions, generating, by the one or more processors, pick and place functions for a robot, the pick and place functions configured to cause the robot to perform the instructions, and providing, by the one or more processors, the pick and place functions to the robot. The method may include performing, by the robot, the pick and place functions. In some instances, the method may include providing a signal that the instructions have been performed. The pick and place functions may be configured to cause the robot to pick an item from a first section of the picking area and place the item into a second location, the first location, and second location being determined from instructions included in the visual instructions.

BRIEF DESCRIPTION OF THE DRAWINGS

Various embodiments of the present disclosure are described herein with reference to the drawings, wherein:

FIG. 6 is an illustration of physical button-pushing devices in accordance with aspects of the disclosure.

DETAILED DESCRIPTION

The technology disclosed herein relates to integrating a robotic system into an existing picking station. The robotic system, for example, may include an image/video capture card or camera configured to capture visual pick and place instructions sent and/or retrieved from the WS of a warehouse system to a display screen originally intended to display instructions to an operator. The captured images may be sent through one or more image processing algorithms in order to parse and extract the instructions and to determine the tasks and functions for a pick and place robot to perform in order to satisfy the instructions. The pick and place robot may then perform the functions including, for example, picking products and placing the picked products into order containers. Upon completion of the functions, the pick and place robot or another physical or software based component of the robotic system may provide a notification to the WS via the warehouse system that the instructions have been completed. This input back to the WS may be in the same form of input provided by an operator which may include pushing one or more physical confirmation buttons (pick-to-light or put-to-light), mouse clicks on a display screen, etc. The WS may then provide additional instructions or the next set of instructions. This process, including the WS providing additional functions and the robotic system performing functions to complete the additional instructions, may be repeated indefinitely, until the WS stops providing instructions, or the robotic system is stopped or otherwise shut down. In this regard, the WS may continue to operate with the pick and place robot as if the instructions being issued by the WS were being completed manually by an operator, while requiring little to no changes or modifications to the WS or existing equipment in the picking station.

As used herein, the term container encompasses bins, totes, cartons, boxes, bags, auto-baggers, conveyors, sorters, containers, and other such places a product could be picked from or placed. To distinguish between containers at the picking location, where products are to be picked, and containers at the placement area where the products are to be placed, the term "container" will be used to identify containers at the picking location and "order container" will be used to identify containers at the placement area.

Figure 1:
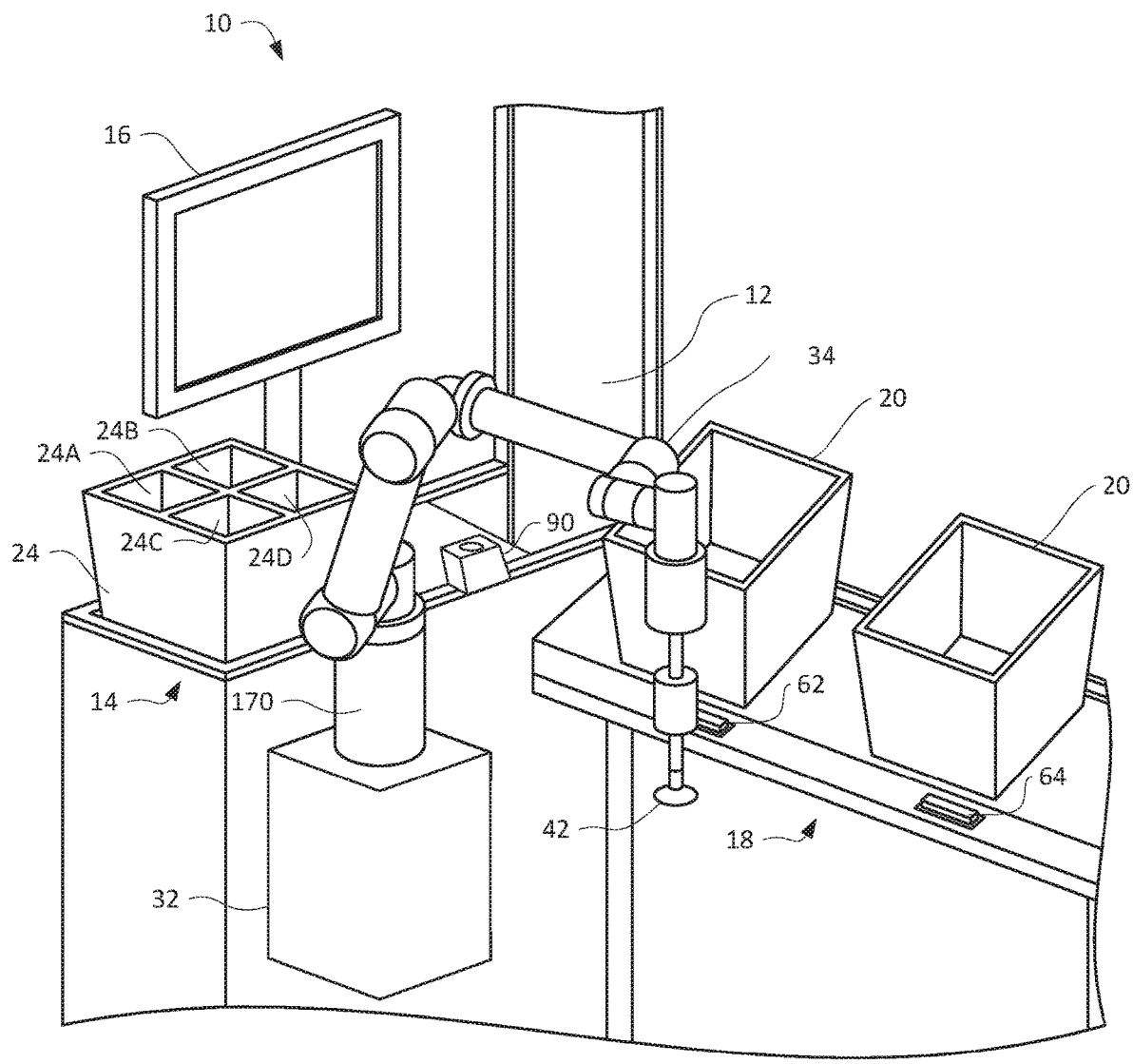
FIG. 1 is an example picking station including a pick and place robot in accordance with embodiments of the disclosure.

FIG. 1 shows an example of a picking station 10 with an integrated pick and place robot 170. Picking station 10 includes a container port 12, a picking area 14, a display screen 16, and a placement area 18 for holding or more order containers 20. The products retrieved by the picker are typically transported to picking station 10 in a container 24 and arrive at the picking station via container port 12. In some instances, the products may have been previously sorted such that a single container 24 includes products of a single product type. In other instances, container 24 may be partitioned into one or more sections, for example, four sections 24A, 24B, 24C, 24D with the products having been previously sorted by product type into each section, such that each section contains one type of product. Still, in other instances, the products of different types may be mixed together within a single container 24 or within each section of a partitioned container.

Pick and place instructions received from the WS are displayed on display screen 16. The pick and place instructions provide instructions as to the type of product item and the quantity of products to pick from container 24, and instructions as to which order container 20 the picked products should be placed. In some instances, the pick and place instructions may include only picking instructions or only placing instructions. For instance, when there is only one possible order container, the instructions may provide only pick instructions, as the place instructions may be implied. Similarly, when there is only one container with one product, the pick instructions may be implied and only place instructions as to which order containers to place the product may be provided.

Additional instructions received from the WS may also be displayed on the display screen 16. For example, additional instructions may include an inventory audit requesting an input of the number of items in a container or order container, various prompts and pop-ups such as error notifications or additional details about a particular pick and place instruction. The aforementioned examples are merely for illustration and the additional instructions may include any information typically output on a display in a picking station.

Upon completion of the pick and place instructions, a button-pushing device (described herein) may push a completion button, signaling to the WS that the pick and place instructions have been completed and triggering another set of the pick and place instructions which are subsequently transmitted to display screen 16. In instances where additional instructions are received, the robotic system 201 (described herein) may provide an appropriate response. For example, a button-pushing device or custom device configured to operate as a virtual instance of a keyboard or mouse may enter the number of items in a container or confirm that the container is empty in response to an audit request.

A typical pick and place robot 170, as shown in FIG. 1, may include a base 32 and a picking arm 34 with an end effector 42 for manipulating and grasping products. Picking arm 34 is freely positionable to allow end effector 42 to reach into container 24 and grasp the instructed item(s), and then move to place the grasped item(s) in the desired order bin 20.

The robotic systems described herein enable pick and place robots to be integrated into a picking station while avoiding or otherwise minimizing the need for a warehouse to modify its WS or the physical components of the picking station.

Figure 2:
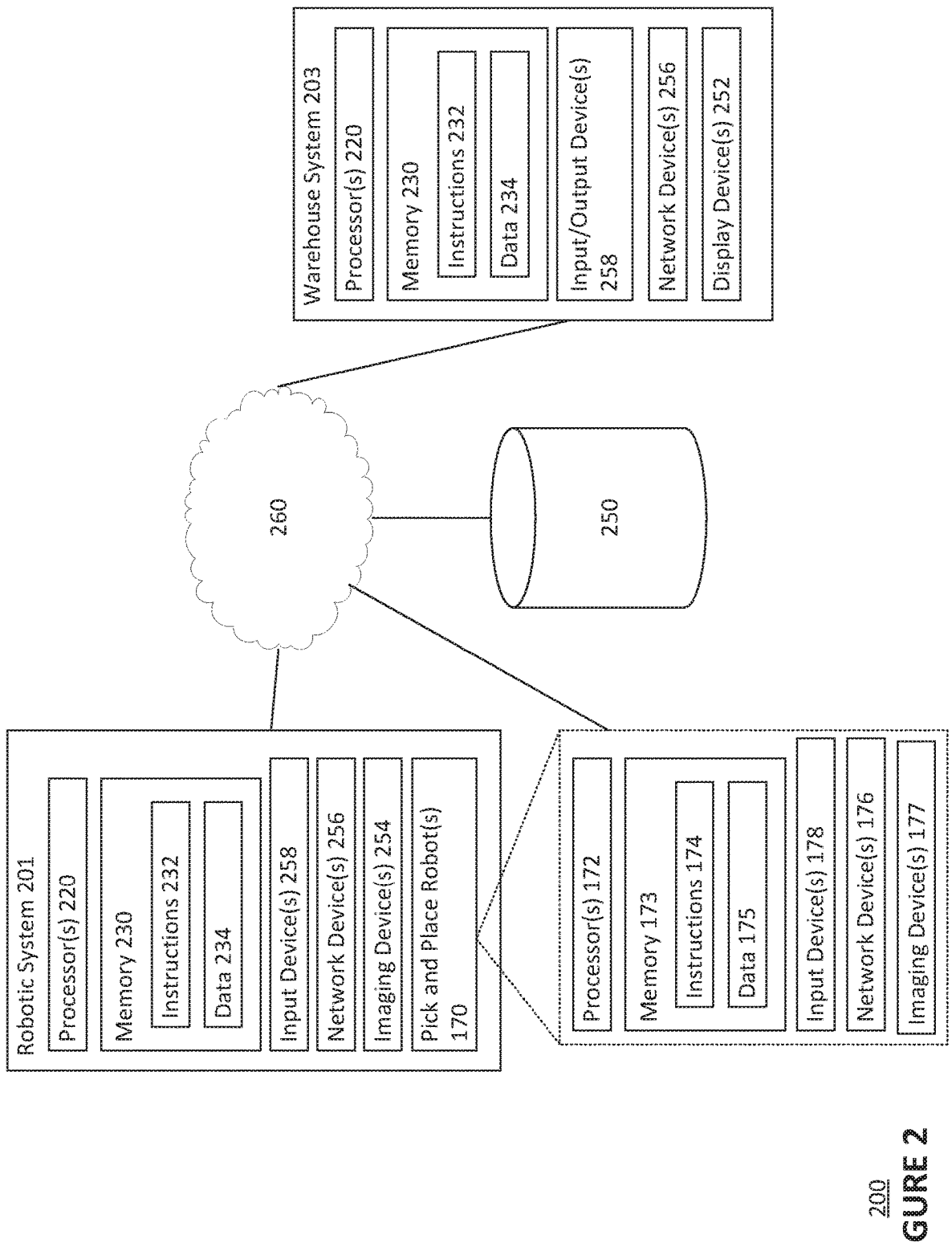
FIG. 2 is a block diagram of a robotic system and a warehouse system in accordance with embodiments of the disclosure.

FIG. 2 shows a block diagram of an example system 200. The system 200 includes a robotic system 201 integrated into existing warehouse system 203. Robotic system 201 includes one or more processors 220, memory 230, one or more network devices 256, one or more input devices 258, one or more imaging devices 254, and one or more pick and place robots 170. The processor 220 may be a commercially available central processing unit ("CPU"), a System on a Chip ("SOC"), an application specific integrated circuit ("ASIC"), a microprocessor, microcontroller, or other such hardware-based processors. In some instances, robotic system 201 may include multiple processor types.

Memory, such as memory 230, may be configured to read, write, and store data 234. Memory 230 may be any solid state or other such non-transitory type memory device. For example memory 230 may include one or more of a hard-drive, a solid state hard drive, NAND memory, flash memory, ROM, EEPROM, RAM, DVD, CD-ROM, write-capable, and read-only memories, or any other device capable of storing data. Data 234 may be retrieved, manipulated, and/or stored by the processor 220 in the memory 230.

Data 234 may include data objects and/or programs, or other such instructions, executable by the processor 220. Data objects may include data received from one or more components, such as other robotic systems, warehouse system 203, processor 220, input device 258, network device 256, data storage 250, pick and place robot 170, etc. The programs can be any computer or machine code capable of being executed by a processor, such as processor 220, including the visual instruction recognition program (e.g., imaging and OCR algorithms,) described herein. The instructions 232 can be stored in any format for processing by a processor or in any other computing device language including scripts or modules. The functions, methods, routines, etc., of the programs for visual instruction recognition and picking are explained in more detail herein. As used herein, the terms "instructions," "applications," "steps," "routines" and "programs" may be used interchangeably.

The robotic system 201 may include at least one network device. The network device, such as network device 256, may be configured to communicatively couple robotic system 201 with the other devices or systems, such as warehouse system 203 and data store 250 via the network 260. In this regard, the network device 256 may be configured to enable the computing device to communicate and receive data, such as identification data described herein, and other such signals to other computing devices or data store 250. The network device 256 may include a network interface card (NIC), WiFi card, Bluetooth receiver/transmitter, or other such device capable of communicating data over a network via one or more communication protocols, such as point-to-point communication (e.g., direct communication between two devices), Ethernet, Wi-Fi, HTTP, Bluetooth, LTE, 3G, 4G, Edge, etc., and various combinations of the foregoing.

Robotic system 201 may include one or more input devices 258 for interacting with the robotic system, pick and place robot 170 or other systems, such as warehouse system 203. Input devices 258 may include components normally used in connection with a computing device such as touch screens, buttons and knobs, mouse, keyboard, microphone, etc.

Figure 3A:
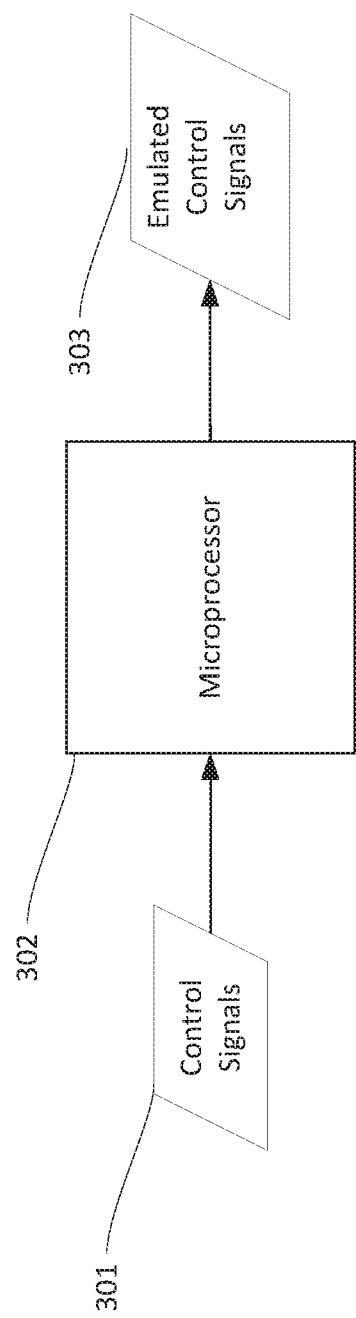
FIG. 3A is an illustration of a virtual button-pushing device in accordance with an embodiment of the disclosure.

In some instances, the input device may be a custom device configured to operate as a virtual instance of a keyboard or mouse. The custom device's operation as a virtual mouse or keyboard may emulate the signals produced by a physical mouse or keyboard controlling a pointer or other such input of the warehouse system 203. For example, and as shown in FIG. 3A, the robotic system 201 may transmit control signals 301 to a processor, such as microprocessor 302, via a wired or wireless connection. The microprocessor 301 (which may also be any other type of processor, including a microcontroller,) may generate emulated control signals 303 which are then, via a wired or wireless connection, input into the warehouse system 203. The emulated control signals may be configured such that they emulate a physical mouse or keyboard. By doing such, the virtual mouse or keyboard of the robotic system 201 may function as an input device for the warehouse system 203.

The robotic system 201 may send commands to a microprocessor 301 using a USB to TTL converter. The microprocessor 301, which is programmed to emulate a pointing device (e.g., mouse or other such input device,) may receive the commands from the robotic system 201 and generate an emulated control signal. Through a connection with the warehouse system 203, such as a USB connection, the microprocessor 301 may output emulated control signal to the warehouse system 203. These commands may include absolute pixel coordinates of a pointer's location and events of holding or releasing mouse buttons, such as mouse-clicks.

Figure 3B:
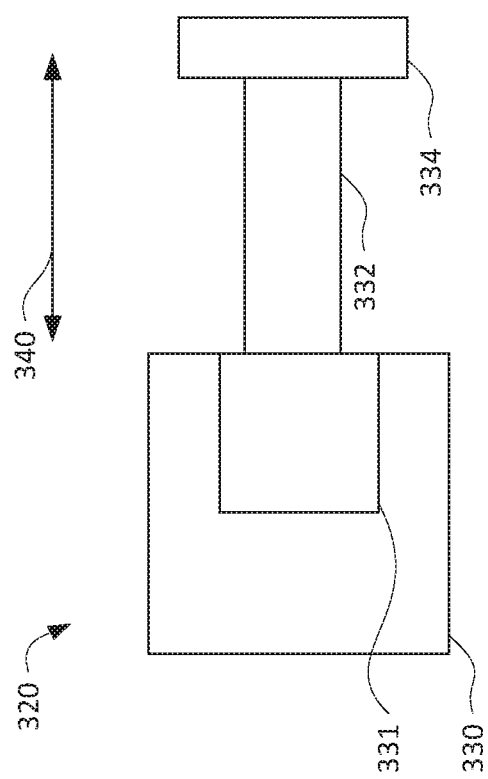
FIG. 3B is an illustration of a physical button-pushing device in accordance with another embodiment of the disclosure.

In another embodiment, the input devices 258 may alternatively be a physical button-pushing device. The physical button-pushing device 320, shown schematically in FIG. 3B, may be any device that is configured to push a physical button, such as physical buttons 62 and 64 shown in FIG. 1, or tap a virtual button, such as presented on a screen display integrated into a computing system, such as the robotic system 101 or warehouse system 203. Button-pushing device 320 includes an actuator motor 331 positioned in housing 330, an arm 332, and a contact 334. The actuator motor 331 may be configured to extend and retract the arm 330 away from and towards housing 330, as illustrated by arrows 340.

The contact 334 may be constructed from a material capable of withstanding continuous button pushes, such as metal, rubber, plastic, etc. The shape of the contact 334 may be commensurate with the button that is to be pushed. For instance, the button may be rectangular in shape, so the contact 334 may also be in a rectangular shape that is slightly smaller than the size of the button to allow for the button to be pressed by the contact 334. In some instances, the contact 334 may be made of a material capable of interacting with virtual buttons, such as a conductive material.

The physical button-pushing device may be configured to adjust and/or move out of the way of an operator. By doing such, the operator may be able to move freely within the picking station, such as in situations where the pick and place robot and operator will operate in the picking station at the same or different times.

In operation each button-pushing device, such as button-pushing device 320 or button-pushing devices 601-607 of FIG. 6 (described herein), may be positioned relative to a respective button, such as in a stand-alone unit or within pick and place robot. Upon receiving a signal from the robotic system, as described herein, the actuator motor 331 may extend the arm 332 until contact 334 pushes or taps the button. The actuator motor 331 may then retract the arm 332 to a resting position, where the button is not pushed. Although the button-pushing devices described herein are described as operating in a linear motion, button-pushing devices may operate on more than one axis and/or move a contact in a rotational motion. Moreover, movement of the contact on the button-pushing devices may be controlled by other types of actuators and drives, such as solenoids, hydraulic or pneumatic actuators, etc. In some instances, the effector 42 or a different device integrated into the pick and place robot 170 may operate as a button pushing device.

Referring back to FIG. 2, robotic system 201 may further include an imaging device 254. Imaging device 254 may include one or more image/video capture cards or cameras. As described herein, the imaging device 254 may be positioned and configured to capture pick and place instructions sent from the WS and displayed on display 16.

The robotic system 201 may exchange data 234 via an internal bus (not shown), a network device 256, direct connections, or other such connections. In this regard, data 234 may be exchanged between the memory 230, data storage device 250, processor 220, input device 258, pick and place robot 170, imaging devices 254, and/or other such components.

Network 260 may include interconnected protocols and systems. The network 160 described herein can be implemented using various protocols and systems, such that the network can be part of the Internet, World Wide Web, specific intranets, wide area networks, or local networks. The network can utilize standard communications protocols, such as Ethernet, Wi-Fi and HTTP, proprietary protocols, and various combinations of the foregoing.

In some instances, the robotic system 201 may be connected to or include one or more data storage devices, such as storage device 250. Data storage device 250 may be one or more of a hard-drive, a solid state hard drive, NAND memory, ROM, RAM, DVD, CD-ROM, write-capable, and read-only memories, or any other device capable of storing data. The data storage device 250 may store data 234, including programs and data objects such as grasping pose detection algorithms. Although FIG. 2 illustrates only a single data storage device attached to a network 260, any number of data storage devices may be connected to the network and/or directly to the robotic system 201.

Although the components of robotic system 201 are shown as being within the same block in FIG. 2, any combination of components of the robotic system may be located in separate housings and/or at different locations. For example, a robotic system may include a pick and place robot 170 located remotely from the other components. In another example, and as further shown in FIG. 2, the pick and place robot 170 may include its own processor 172, memory 173 storing instructions 174 and data 175, input devices 178, network devices 176, and imaging devices 177. In yet another example, the entire robotic system may be included in a pick and place robot 270. Remotely located components may communicate with the other components of the robotic system 201 through one or more connections, such as an external bus (not shown), a network device 256 and networked connections, direct connections, or other such connections.

References to a processor, computer, or robot will be understood to include references to a collection of processors, computers, robots that may or may not operate in parallel and/or in coordination.

The warehouse system 203 may include some of the components shown in robotic system 201, including a processor 220, memory 230, and/or network device 256. The warehouse system 203 may also include input/output (I/O) devices and/or data storage, such as data storage 250. I/O devices may include the input devices described in relation to the robotic system 201 (input devices 258) and output devices may include devices capable of outputting and/or displaying visual instructions including displays 252, such as display 16 (FIG. 1), video cards, printers, etc.

In addition to the operations described above and illustrated in the figures, various operations will now be described. The following operations do not have to be performed in the precise order described below. Rather, various steps can be handled in a different order or simultaneously, and steps may also be added or omitted.

Figure 4:
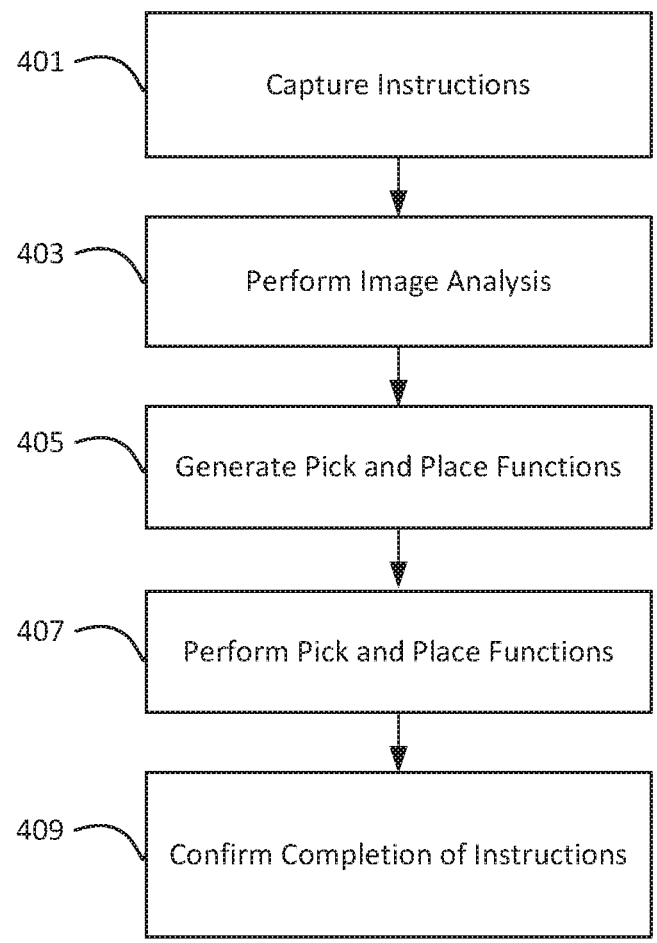
FIG. 4 is a flow chart illustrating the operation of a robotic system in accordance with aspects of the disclosure.

Use of the robotic system 201 integrated into warehouse system 203 will now be described with reference to flowchart 400 in FIG. 4.

As shown in block 401, instructions may be captured by an imaging device, such as imaging device 254. The imaging device, such as camera 90, may be positioned in front of display device 16 of picking station 10 to capture the visual instructions sent by the WS, executed on the warehouse system 203 and displayed on the display device 16. Camera 90 may be configured to capture images at predetermined periods, such as every second or more or less frequently.

Although the imaging device is sometimes described herein as a camera, in other instances the imaging device may be an image and/or video capture card (collectively or individually "capture cards") connected to the warehouse system. In this regard, the image/video capture card may connect to the warehouse system 203 and receive the visual instructions directly, or indirectly, from the WS in the form of a video signal. For example, the video capture card may capture video signals intended for output on display device 16 of warehouse system 203 by connecting to the display device 16 or otherwise intercepting the video signals intended for the display device 16. A capture card may be any device that is capable of replicating, recording, and/or capturing the output of a display or video signals, such as digital or analog video signals. The replicated, recorded, and/or captured video signal (collectively or individually "captured video") may be provided to another computer or processor, such as the processor 220. The captured video may appear as a video recording device, such as a webcam, on the another computer.

Figure 5A:
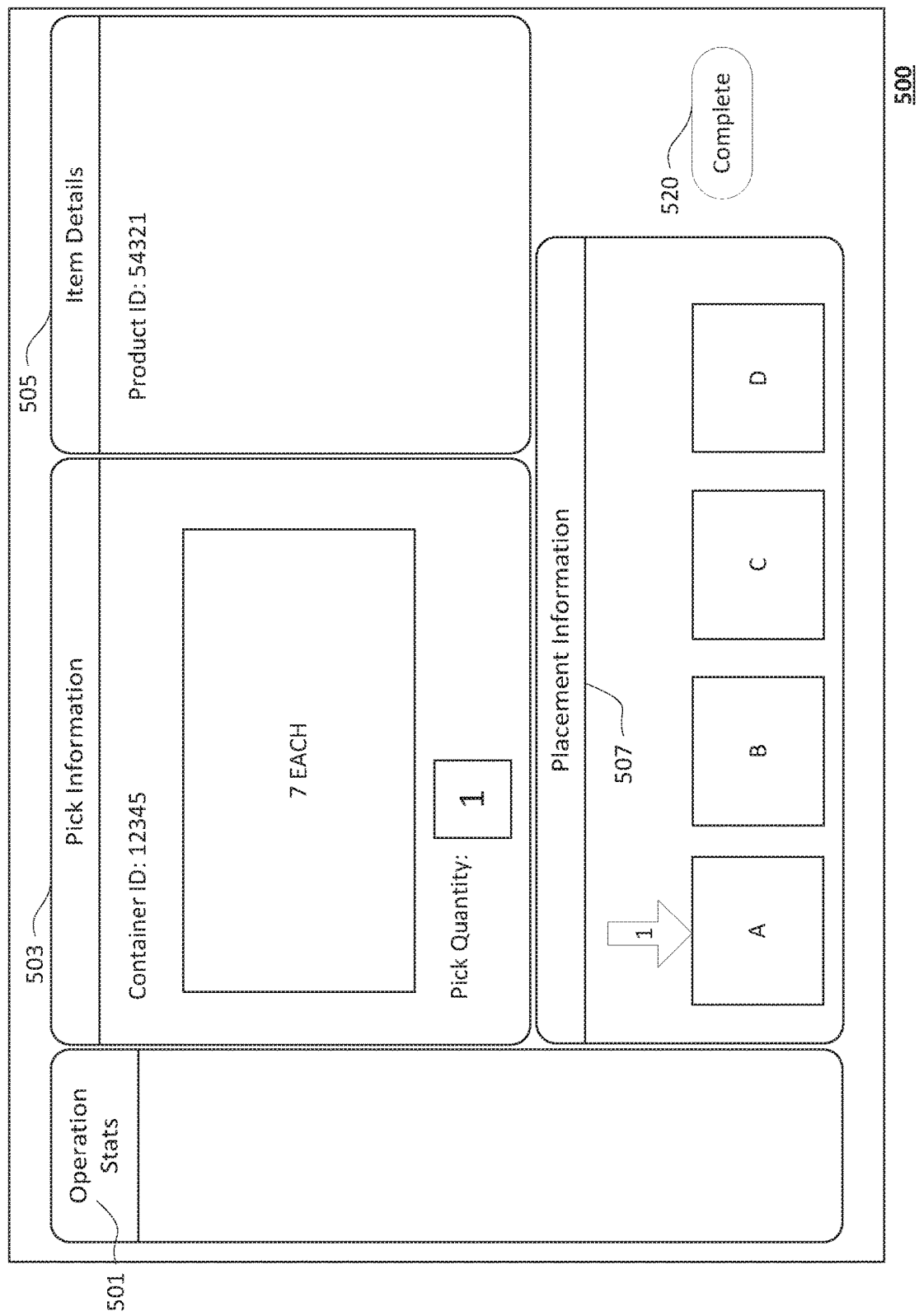
FIGS. 5A and 5B illustrate example pick and place instructions received from the warehouse software and captured by the robotic system.

The visual instructions may include details corresponding to the type of inventory being stored in the picking area, the configuration of the picking area or how it may be divided, the quantity of products to pick, the target location for each of the picked products, and other inventory, product, or order information that may be relevant to the task. FIG. 5A illustrates an example visual instruction 500 captured by the robotic system, including operation stats of the WS 501, Pick Information 505 including the quantity of products to pick from the container in the pickup location (pick quantity), and Placement Information 507 including details about where the products from the container in the pickup location should be deposited (illustrated by the arrow). Additional information may be included in the visual instructions, such as pictures of the item to be picked (not shown), as well as buttons for interacting with the WS. The buttons may include a "complete" button 520 that may provide a notification to the WS that the currently displayed visual instructions have been completed.

Visual instruction recognition may be performed on the captured image, as shown in block 403. In this regard, a processor, such as processor 220 may execute one more programs that take as input, the captured images or videos, and execute vision and optical character recognition algorithms, to determine the pick and place instructions included in the visual instructions. For example, vision algorithms may include algorithms configured to look for landmark features on the display. These algorithms may be customized for different screen formats and graphical interfaces. The visual algorithms may determine the appropriate places to 'look' for certain information, which may be considered regions of interest (RoI). For each RoI, character recognition algorithms, such as optical character recognition algorithms, may be executed on that RoI. Different visual information may be processed in different ways. For example, to read quantity of picks or the SKU/barcode number an optical character recognition algorithm may be used to extract the quantity of picks and/or the SKU/barcode from the visual instructions. In another example an algorithm that visually identifies a highlighted partition of the divided container may be used to determine which section of the container the target inventory item is located. Visual instruction recognition may also be performed on additional instructions.

In some instances, additional details, such as the product identification may also be determined. For instance, and referring to FIG. 5A, after completing the visual instruction recognition programs, the processor 220 may determine that there are 7 products in container 12345 and that 1 of the products needs to be picked from the container 12345. Additionally, it may be determined that the 1 picked item needs to be placed into individual order container 'A'. In some instances, the visual instruction recognition program may also determine the item being picked is product 54321. Other details included in the visual instructions such as product specific information such as product weight, dimensions, type, etc. or order specific information may also be determined by the visual instruction recognition programs.

Figure 5B:
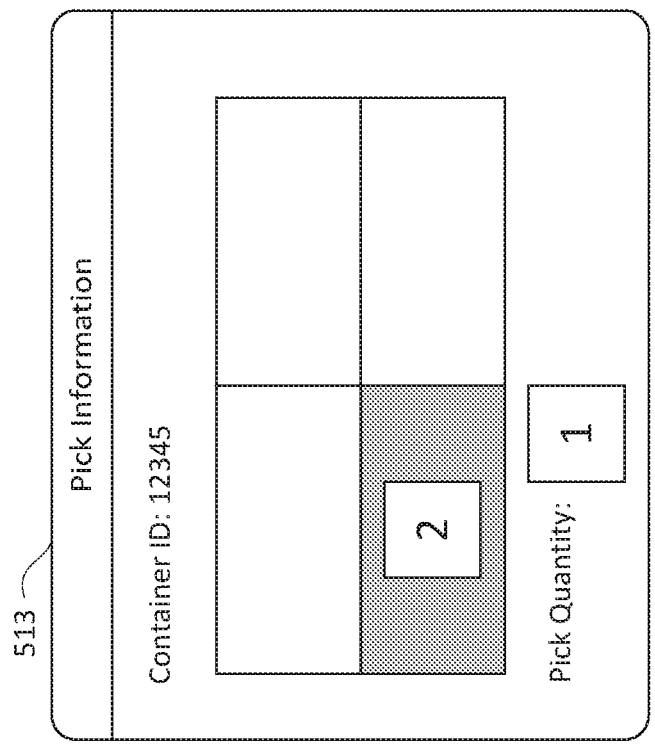

In some instances, captured visual instructions may include Pick Information corresponding to containers having multiple sections separated by a partition. For example, and as shown in pick information 513 of FIG. 5B, the container includes four sections with visual instructions to pick '1' item (shown in the "Pick Quantity") from the two available products in the highlighted, lower-left section.

The visual instruction recognition program may monitor for changes between captured images to determine if new visual instructions have been provided by the WS. In this regard, if there are no changes between a new captured image and the previous captured image, no additional processing of the images may be performed, nor will new pick and place functions, described herein, be generated.

Using the determined pick and place instructions, pick and place functions for robot 170, or other components of the robotic system 201, may be generated, as shown in block 405. The pick and place functions may be commands which robot 170 performs to pick and place the products in accordance with the determined pick and place instructions. For example, and continuing the example with the captured visual instructions shown in FIG. 5A, the processor 220 may generate pick and place functions for robot 170 that include picking '1' item from container 24 and placing that item into order container 'A' of the plurality of order containers 20. In instances where there are different product types in the container in the pickup location, the generated pick and place functions may include functions to differentiate between the products or designate the correct partition within the picking area from which to pick. Similarly, one or more products may need to be picked and placed into one or more locations. The determined pick and place instructions will account for all of the possible enumerations in pick and place tasks.

Functions for robot 170, or other components of the robotic system 201, may be generated based on any determined additional instructions. For instance, the additional instructions may be an audit requesting a notification of the number of products in a container. After executing the visual algorithms, functions for the robot 170 may be generated that instruct the robot 170 to capture an image of the contents of the container, determine the number of products in the container, and provide the number of products into the container to the warehouse system.

As shown in block 407, pick and place robot 170 may receive the pick and place functions and perform them. By performing the pick and place functions generated from the visual instructions, the instructions in the visual instructions may be completed and completion of the instructions may be confirmed, as shown in block 409. Referring to FIG. 1, the picking station 10 may include physical completion buttons 62 and 64 that may be pressed when a visual instruction is completed. As described, one or more completion buttons may also be presented on display device 252, such as display 16, of warehouse system 203. By pressing a completion button the WS may be notified that the current visual instruction has been completed and the next visual instruction may be sent to the display 252. Alternatively, the "complete" or similar button on the display 252 may be selected to provide notification to the WS that the current instruction has been completed.

Completion of the instructions may be confirmed to the WS by an input device of the robotic system 201. For instance, the robotic system 201 may implement a custom device configured to operate as a virtual keyboard or mouse (described herein) which emulates a keyboard or mouse on the warehouse system 203. The virtual keyboard or mouse may select the "complete" button displayed on the display once the pick and place robot 170 completes the pick and place functions generated based on the currently displayed visual instructions. Although the button-pushing devices described herein are described as being utilized to indicate completion of instructions to the WS, the button-pushing devices may be utilized to provide other inputs into the WS, such as a response to additional instructions.

In another example, button-pushing devices, such as physical button-pushing devices 601-607, may be placed in front of the physical buttons 611-617 as shown in FIG. 6. Upon robot 170 completing the pick and place functions generated based on the currently displayed visual instructions, the robotic system 201 may trigger one of the button-pushing devices 601-607 to push one of the physical buttons 611-617 positioned in front of containers 621-627. In another example, the display on which the "complete" button is displayed may be a touch-screen. In this scenario, a button-pushing device with a capacitive contact may be positioned in the vicinity of the touch-screen such that when triggered, the capacitive contact selects the "complete" button. The physical button-pushing devices may also be used to input responses to additional instructions. The aforementioned steps may be repeated 401-409 may be repeated.

Any action that can be taken via mouse, keyboard, etc., through the program displayed on a display in the warehouse system 203, such as on display device 252, could also be performed by the robotic system 201, either autonomously or via tele-operator. For example, the robotic system 201 may push any sequence of buttons (physically or through use of the custom device) to load new orders, confirm inventory audits, change system settings, or perform any other action that can be done on a normal mouse and keyboard connected to the computer controlling the display device 252.

A remote desktop for interacting with the warehouse system 203 may be implemented using the custom device and capture card. In this regard, either the robot 170 or robotic system 201. The remote desktop may be used by a tele-operator to perform any actions that could be done with a keyboard and mouse through the program displayed on a display device, such as display 252. In this regard, the captured video may be provided (e.g., streamed,) to the tele-operator such as through a display of a computer system being used by the tele-operator. The tele-operator may then send back mouse clicks or keyboard strokes, or other such input signals, back to the robotic system 201 or pick and place robot 170, which may then provide corresponding emulated control signals to the warehouse system 203 via the custom device, as described herein.

The captured video may be monitored for any purpose related to the robotic system 201. For example, the captured video, any information parsed or determined from the captured video, or any data relating to the robotic system's 201 status and performance, may be provided to a web app, application, or other local screen (collectively or individually, "status applications") to allow for supervision of the robotic system 201, such as the operation of pick and place robot 170, or a fleet of pick and place robots, as well as to monitor the WS. By providing the captured video through a status application, an onsite or offsite warehouse worker may be able to supervise the WS and robotic system. In this regard, the status applications may be populated information about each of the pick and place robots that may be running with information supplied by the individual pick and place robots (e.g., pick and place robot 170,) and the robotic system 201. This information may include information such as speed, accuracy, number of tasks completed that hour, etc., information about the visual instructions the robotic system 201 is capturing.

The status application may allow a warehouse worker the ability to interact with and monitor the robotic system remotely, such as described above with regard to the remote desktop. For example, in the event an additional instruction such as a prompt cannot be cleared autonomously by the robotic system, the remote warehouse worker may manually address the prompt through the status application without the need to physically go to the picking location where the prompt is displayed.

In another example, if the visual instructions request an action the robotic system is unable to decipher or perform autonomously, such as supply a new tote because no more totes are available, close a box and apply a label to it, etc., then the status application may notify a person of where the visual instructions are displayed, which pick and place robot 170 needs assistance, what the issue is, when the assistance is needed by, etc. For example, the status application may provide a notification such as "robot 32 needs to have a box sealed and label applied" or "robot 6 is in a protective stop due to a collision, manual intervention necessary," or the like.

The technology described herein enables a pick and place robot to be integrated into an existing picking station. The pick and place instructions determined from captured visual instructions provide high-level pick and place instructions corresponding to products to pick and where to place the products. For example the pick and place instructions may include instructions that say pick 2 products from the pick area and place 1 product into order location 1 and the other product into order location 2. The pick and place robot may then execute a separate algorithm to determine how to grasp each of the two products to be picked and how to move the products to their respective order locations. In this regard, the pick and place robot may use other sensor information based on what the product looks like, the product's shape, etc., to determine how to move to properly grasp the product.

In some instances, the pick and place robot may grasp a product first, then scan the product. The display may then provide additional instructions including which location the item needs to be placed into. An imaging device or capture card may capture these additional instructions, which may then be subjected to the visual and optical character recognition algorithms described herein to determine instructions for the pick and place robot. This scenario may occur when many products corresponding to several orders are incorporated into a single container. In this regard, the pick and place robot may not know where to place the item until further instructions are provided by the WS.

Although the technology herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A parsing system, comprising:
an imaging device configured to capture visual instructions provided by a warehouse or fulfillment center system and displayed on a monitor;
a custom device configured to emulate signals generated by input devices within the warehouse or fulfillment center system; and
one or more processors, wherein the one or more processors are configured to:
receive, from the imaging device, captured visual instructions;
process the received visual instructions to determine task instructions included in the received visual instructions; and
generate functions for a robot to perform based on the determined task instructions, the functions configured to cause the robot to perform the determined task instructions.

2. The parsing system of claim 1, further comprising:
the robot, wherein the robot includes a picking arm configured to grasp an item from a first location and place the item in a second location.

3. The parsing system of claim 2, wherein the robot is further configured to:
perform the functions; and
provide a confirmation of completion of the functions to the one or more processors after performing the functions.

4. The parsing system of claim 1, wherein the one or more processors are further configured to transmit a completion response indicating completion of the captured visual instructions to the warehouse or fulfillment center system, after receiving a confirmation of completion of the functions from the robot.

5. The parsing system of claim 1, wherein the functions configured to cause the robot to perform the determined task instructions include one or more functions configured to cause the robot to pick an item from a first location and place the item in a second location.

6. The parsing system of claim 1, wherein the parsing system further includes a physical button-pushing device, wherein the physical button-pushing device pushes a button connected to the warehouse or fulfillment center system to provide a completion response to the warehouse or fulfillment center system.

7. The parsing system of claim 6, wherein the completion response provided by the physical button-pushing device notifies the warehouse or fulfillment center system of completion of the captured visual instructions in response to receiving a confirmation of completion of the functions from the robot.

8. The parsing system of claim 1, wherein the custom device is further configured to:
transmit, in response to receiving a confirmation of completion of the functions from the robot, one or more emulated signals to provide a completion response notifying the warehouse or fulfillment center system of completion of the captured visual instructions.

9. The parsing system of claim 1, wherein the imaging device is a camera configured to capture an image of the visual instructions displayed on the monitor.

10. The parsing system of claim 1, wherein the imaging device is an image or video capture card.

11. A system, comprising:
robot having a picking arm configured to grasp an item from a first location and place the grasped item in a second location spaced from the first location;
an imaging device to capture visual instructions provided by a warehouse or fulfillment center system and displayed on a monitor;
a custom device configured to transmit a completion response to the warehouse or fulfillment center system; and
one or more processors, wherein the one or more processors are configured to:
receive, from the imaging device, captured visual instructions;
generate functions for the robot to perform based on the captured visual instructions; and
transmit, via the custom device, the completion response to the warehouse or fulfillment center system indicating completion of the captured visual instructions after receiving a confirmation of completion of the generated functions from the robot.

12. The system of claim 11, wherein the robot is further configured to:
perform the generated functions; and
provide the confirmation of completion of the generated functions.

13. The system of claim 11, wherein the first location is a first container and the second location is a second container.

14. A method comprising:
receiving, by one or more processors, an image including visual instructions displayed on a monitor and provided by a warehouse or fulfillment center system;
by the one or more processors, task instructions included in the visual instructions;
generating, by the one or more processors, task functions for a robot, the task functions configured to cause the robot to perform the determined task instructions;
receiving, by the one more processors, a confirmation of completion of the task functions from the robot; and
transmitting, via a custom device configured to emulate signals generated by input devices, a completion response to the warehouse or fulfillment center system indicating completion of the task instructions after receiving the confirmation of completion of the task functions from the robot.

15. The method of claim 14, wherein the one or more processors is distinct from the warehouse or fulfillment center system; and
the one or more processors are located within the robot or external to the robot.

16. The method of claim 14, further comprising:
performing, by the robot, the task functions; and
providing, by the robot, the confirmation of completion of the task functions to the one or more processors after performing the task functions.

17. The method of claim 14, wherein the task functions are further configured to cause the robot to pick an item from a first section of a first container and place the item into a second container, the first section of the first container and/or the second container being determined from the task instructions.

18. The system of claim 11, wherein the warehouse or fulfillment center system is pre-existing.

* * * * *